P. H. SWEET.
GUMMER.
APPLICATION FILED APR. 4, 1916.

1,197,682. Patented Sept. 12, 1916.

Fig. 2ª.

Inventor
P. H. Sweet
By his Attorney John O. Seifert

UNITED STATES PATENT OFFICE.

PARKER H. SWEET, OF BOONTON, NEW JERSEY, ASSIGNOR TO BARKER-SWEET MANUFACTURING COMPANY, OF JAMAICA, NEW YORK, A CORPORATION OF NEW YORK.

GUMMER.

1,197,682.  Specification of Letters Patent.  Patented Sept. 12, 1916.

Application filed April 4, 1916. Serial No. 88,954.

*To all whom it may concern:*

Be it known that I, PARKER H. SWEET, a citizen of the United States, residing in Boonton, in the county of Morris and State of New Jersey, have invented new and useful Improvements in Gummers, of which the following is a specification.

This invention relates to a tool commonly known as a "gummer" for sharpening or gulleting saws and particularly gin or linter saws, and it is the object of the invention to provide an improved tool of this character. In tools of this character a disk is provided with file teeth on opposite sides adjacent the periphery of the disk and on the periphery of the disk, the file teeth on one side being substantially at a right angle to the axis of rotation of the tool, while the teeth on the opposite side are at an acute or obtuse angle to the axis of rotation and merging in a face at a right angle to the axis of rotation. Heretofore in the manufacture of said tools the blank for the tool was turned up from a piece of stock of a thickness equal to a depth from the base of the portion inclining at an acute angle to the opposite face of the disk on which one set of the file teeth are formed plus a portion to project beyond and provide a recess between the base of said inclined portion and that portion of the tool to form a shoulder for the means to secure it to its operating shaft or arbor.

It is the object of the invention to overcome the necessity of turning up the blank for the tool from a piece of stock by punching it from a flat piece of stock and drawing it to required form.

Figure 1:
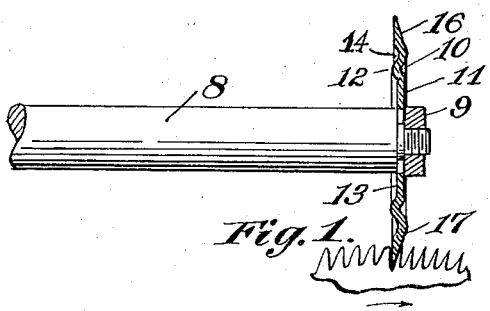
Figure 2:
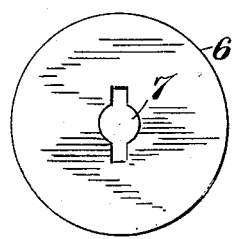
Figure 5:
Figure 5:
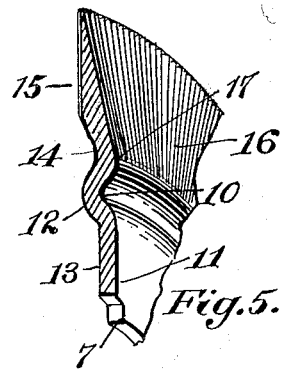
Figure 3:
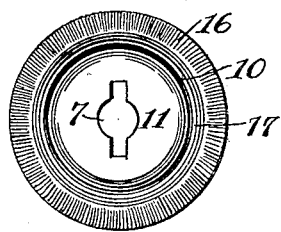
Figure 4:
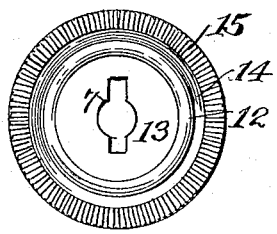

In the drawing accompanying and forming a part of this specification Figure 1 is a sectional side elevation of my improved tool connected to an operating shaft and showing the relation thereof to a saw being sharpened. Fig. 2 is a plan view of a blank punched out from a flat piece of stock from which the tool is drawn to form. Fig. 2ᵃ is a cross sectional view of the blank shown in Fig. 2. Fig. 3 is a view of the finished tool looking at the right of Fig. 1. Fig. 4 is a view of the finished tool looking at the left of Fig. 1; and Fig. 5 is an enlarged sectional view in perspective of a portion of the finished tool.

Similar characters of reference designate like parts throughout the different views of the drawing.

In carrying out the invention as shown in the drawing there is stamped from a piece of flat stock of the same thickness throughout, a disk 6, (Figs. 2 and 2ᵃ), and provided with a central perforation 7 having a circular portion and opposite rectangular portions for the engagement of a correspondingly shaped portion on the end of an operating shaft or arbor 8, to the end of which shaft the tool is secured by a nut 9 connected to a threaded end of the shaft projecting through said opening, as clearly shown in Fig. 1, whereby the tool will be rotated with said shaft.

After the disk has been stamped from a sheet it is drawn in a suitable die to provide an annular recess 10 so that the outer edges of said recess or groove are flush with a flat portion of one face of the disk, as at 11, this recess forming an annular bead or projection 12 extending beyond and with the base of the bead flush with a flat portion 13 on the face of the disk opposite to the face 11. Simultaneously with the forming of the recess 10 and bead 12 the disk is formed with an annular recess 14 and a flat portion or face 15, from said recess 14 to the periphery of the disk, this face 15 being in a plane parallel with the face 13 but extending axially beyond said face to lie in a plane with the bead 12, as clearly shown in Fig. 1.

The periphery of the disk is preferably rounded or curved and a portion of the disk opposite to the face 15 is inclined at an acute or oblique angle inclining from the periphery of the disk to the axis, as shown at 16 Figs. 1 and 5, with the base of said face 16 merging in a curved portion into the recess 10, as at 17, with said portion 17 in a plane parallel with the face 11. The portion of the disk between the faces 11 and 13 constitutes the body portion of the tool in which the opening 7 is located and whereby the tool is secured to the end of its operating arbor or shaft.

After the disk has been formed to the shape shown in cross section in Figs. 1 and 5 the faces 15 and 16 as well as the rounded periphery of the disk are provided with file teeth as shown in Figs. 3, 4 and 5. The recess 10 and bead 12 serve to stiffen and make the tool rigid resisting any change in shape or form of the tool in use. Furthermore, the recesses 10 and 14 provide run-offs for the faces 15 and 16 facilitating the forming of the file teeth on said faces, and in the operation of sharpening or gulleting a saw forms a tooth space to be cut relatively deep and lengthening the tooth as compared with the depth of tooth spaces permissible to be formed by gummers as heretofore constructed.

Having thus described my invention I claim:

1. As an article of manufacture, a gummer comprising a disk stamped from a sheet of material provided with a body portion having opposite faces extending in parallel planes, with a flat portion at one side of the disk extending from the periphery to a point adjacent the face of the body portion and a portion opposite to said flat portion adjacent the periphery of the disk inclining at an obtuse angle from the periphery of the disk to the axis with the base of said inclined portion in a plane parallel with the opposite face of the body portion, and file teeth being formed on said portions adjacent the periphery of the disk, substantially as and for the purpose specified.

2. As an article of manufacture, a gummer comprising a disk stamped from a sheet of material provided with a body portion having opposite faces extending in parallel planes with an annular recess at the periphery of one face of the body forming an annular bead at the periphery of the opposite face of the body extending beyond said face, an annular flat portion extending from the periphery of the disk to a point adjacent the bead and lying in a plane with said bead and parallel with said side face of the body portion, and an annular flat portion opposite to said flat portion inclining from the periphery at an obtuse angle to the axis with the base of the inclined face in a plane with the recessed side of the disk, and file teeth being formed on said flat and inclined faces adjacent the periphery, substantially as and for the purpose specified.

3. As an article of manufacture, a gummer comprising a disk stamped from a sheet of material provided with a body portion having opposite faces extending in parallel planes, an annular recess at the periphery of one face of the body forming an annular bead at the periphery of the opposite face of the body and extending beyond said face, an annular flat portion extending from the periphery of the disk to a point adjacent the bead with an annular recess between said face and bead and the face lying in the same plane as the bead and parallel with said face of the body portion, and an annular flat portion opposite to said flat portion inclining from the periphery at an obtuse angle to the axis with the base merging with the annular recess portion by a curved portion with said curved portion lying in the same plane as the side face of the body portion, and file teeth being formed on said annular faces adjacent the periphery and the periphery of the disk, substantially as and for the purpose specified.

PARKER H. SWEET.

Copies of this patent may be obtained for five cents each, by addressing the "Commissioner of Patents, Washington, D. C."